United States Patent
Du et al.

(10) Patent No.: US 12,229,864 B2
(45) Date of Patent: Feb. 18, 2025

(54) RUNTIME MECHANISM TO OPTIMIZE SHADER EXECUTION FLOW

(71) Applicant: QUALCOMM Incorporated, San Diego, CA (US)

(72) Inventors: Yun Du, San Diego, CA (US); Eric Demers, San Diego, CA (US); Andrew Evan Gruber, Arlington, MA (US); Chun Yu, Rancho Santa Fe, CA (US); Baoguang Yang, Fremont, CA (US); Chihong Zhang, San Diego, CA (US); Yuehai Du, San Diego, CA (US); Avinash Seetharamaiah, San Diego, CA (US); Jonnala Gadda Nagendra Kumar, San Diego, CA (US); Gang Zhong, San Diego, CA (US); Zilin Ying, San Diego, CA (US); Fei Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 196 days.

(21) Appl. No.: 17/817,815

(22) Filed: Aug. 5, 2022

(65) Prior Publication Data
US 2024/0046543 A1     Feb. 8, 2024

(51) Int. Cl.
*G06T 15/00*  (2011.01)
*G06T 15/80*  (2011.01)

(52) U.S. Cl.
CPC ............ *G06T 15/005* (2013.01); *G06T 15/80* (2013.01)

(58) Field of Classification Search
CPC ... G06T 15/005; G06T 15/80; G06F 9/45516; G06F 9/4881
See application file for complete search history.

(56) References Cited

U.S. PATENT DOCUMENTS

2006/0005178 A1*  1/2006  Kilgard ............... G06T 15/005
                                                           717/153
2011/0029763 A1   2/2011  Tani
(Continued)

FOREIGN PATENT DOCUMENTS

WO     2006014388 A2     2/2006

OTHER PUBLICATIONS

Harris M., et al., "GPU Gems 2—Chapter 34. GPU Flow-Control Idioms", Apr. 1, 2005, pp. 1-11, XP055198276, p. 3-p. 7.
(Continued)

*Primary Examiner* — William A Beutel
(74) *Attorney, Agent, or Firm* — Procopio, Cory, Hargreaves & Savitch

(57) ABSTRACT

This disclosure provides systems, devices, apparatus, and methods, including computer programs encoded on storage media, for runtime optimization of the shader execution flow. A graphics processor may obtain instruction execution data associated with a graphics workload, the instruction execution data including graphics data for a set of shader operations. The graphics processor may configure, at a first iteration, at least one predication value based on the instruction execution data including the graphics data for the set of shader operations. The graphics processor may adjust, at a second iteration, an execution flow of the graphics workload based on the configured at least one predication value, the execution flow of the graphics workload including the set of shader operations. The graphics processor may execute or refrain from executing, at the second iteration, each of the set of shader operations based on the adjusted execution flow of the graphics workload.

28 Claims, 11 Drawing Sheets

(56) References Cited

U.S. PATENT DOCUMENTS

2017/0243320 A1* 8/2017 Gruber ..................... G06T 5/94
2018/0357043 A1* 12/2018 Alsup ................... G06F 7/5443
2020/0167999 A1* 5/2020 Schmit ................... G06F 3/013

OTHER PUBLICATIONS

International Search Report and Written Opinion—PCT/US2023/028380—ISA/EPO—Nov. 27, 2023.

* cited by examiner

```
1   void RadiusPS( float4 positionInViewport : SV_Position, out float4 output : SV_Target0)
2   {
3       int3 p = int3(positionInViewport.xy, 0) * 2;
4       float4 depths;
5       depths.x = DepthTexture.Load(p);
6       depths.y = DepthTexture.Load(p, int2(1, 0));
7       depths.z = DepthTexture.Load(p, int2(0, 1));
8       depths.w = DepthTexture.Load(p, int2(1, 1));
9       float3 illumination00 = IlluminationTexture.Load(p);
10      float3 illumination10 = IlluminationTexture.Load(p, int2(1, 0));
11      float3 illumination01 = IlluminationTexture.Load(p, int2(0, 1));
12      float3 illumination11 = IlluminationTexture.Load(p, int2(1, 1));
13      float radius00 = Radius(depths.x);
14      float radius10 = Radius(depths.y);
15      float radius01 = Radius(depths.z);
16      float radius11 = Radius(depths.w);
17      output.xyz = (illumination00 * radius00 + illumination01 * radius01
18          + illumination10 * radius10 + illumination11 * radius11) / 4;
19      float radius = dot(float4(radius00, radius10, radius01, radius11), 0.25);
20      output.w = radius;
21  }
22  float4 Radius(float4 depth)
23  {
24      float4 zInView = -1.0f / (depth * LinearizeZFactor0 + LinearizeZFactor1);
25      float4 distance = -zInView;
26      return (-(1.0 - max(1.0, InFocusStartDistance / distance)) * NearOutOfFocusFactor +
27          (1.0 - min(1.0, InFocusEndDistance / distance)) * FarOutOfFocusFactor);
28  }
```

```
1    Void RadiusPS( float 4 positionInViewport : SV_Position, out float4 output : SV_Target0)
2    {
3
4           int3 p = int3(positionInViewport.xy,0) * 2
5
6           //case: FB_pred[0] == 1
7           pred_FB_false #0 Label_PASS1; // jump to PASS1 if false
8           Call Label_PROG_A;
9           (sy) cmp.eq p0, src0, 0.0; //compare src0==0 of feedback instruction
10          pred_false;
11          Call Label_PROG_B;
12          pred_end;
13          jump label_PROG_C:
14
15   Label_PASS1:
16          //case: FB_pred[1] == 1
17          pred_FB_false #1 Label_PASS2; //jump to PASS2 if false
18          Call Label_PROG_B;
19          (sy) cmp.eq p0, src1, 0.0; //compare src==0 of feedback instruction
20          pred_false;
21          Call Label_PROG_A;
22          pre_end
23          jump label_PROG_C;
24
25   Label_PASS2:
26          //case: default
27          call Label_PROG_A;
28          call Label_PROG_B;
29          jump label_PROG_C;
30
31   Label_PROG_A:   //just branching can be used, no predication below
32          float4 depths;
33          depths.x = DepthTexture.Load(p);
34          depths.y = DepthTexture.Load(p, int2(1, 0));
35          depths.z = DepthTexture.Load(p, int2(0, 1));
36          depths.w = DepthTexture.Load(p, int2(1, 1));
37          float radius00 = Radius(depths.x);
38          float radius10 = Radius(depths.y);
39          float radius01 = Radius(depths.z);
40          float radius11 = Radius(depths.w);
41   return;
42
43   Label_PROG_B:  //just branching can be used, no predication below
44          float3 illumination00 = IlluminationTexure.load(p);
45          float3 illumination10 = IlluminationTexure.load(p, int2(1, 0));
46          float3 illumination01 = IlluminationTexure.load(p, int2(0, 1));
47          float3 illumination11 = IlluminationTexure.load(p, int2(1, 1));
48   return;
49
50   label_PROG_C:
51          collect_FB;   //collect src0/src1 0 feedback
52          output.xyz=(illumination00 * radius00 + illumination01 * radius01 + illumination10 *
53   radius10 + illumination11 * radius11) / 4;
54          float radius = dot(float4(radius00, radius10, radius01, radius11), 0.25);
55          output.w=radius;
```

FIG. 8

RUNTIME MECHANISM TO OPTIMIZE SHADER EXECUTION FLOW

TECHNICAL FIELD

The present disclosure relates generally to processing systems, and more particularly, to one or more techniques for graphics processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor may be configured to convert digital information received from a CPU to analog values and may issue commands to a display panel for displaying the visual content. A device that provides content for visual presentation on a display may utilize a CPU, a GPU, and/or a display processor.

Current techniques may not address unneeded execution of redundant shader program operations in graphics applications. There is a need for improved shader program execution techniques.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may obtain instruction execution data associated with a graphics workload. The instruction execution data may include graphics data for a set of shader operations. The apparatus may configure, at a first iteration, at least one predication value based on the instruction execution data including the graphics data for the set of shader operations. The at least one predication value may indicate a likelihood of an occurrence of a condition for the graphics workload. The condition for the graphics workload may be associated with a streaming processor of a graphics processing unit (GPU). The apparatus may adjust, at a second iteration subsequent to the first iteration and without altering a function or a result of the graphics workload, an execution flow of the graphics workload based on the configured at least one predication value. The execution flow of the graphics workload may include the set of shader operations. The apparatus may execute or refrain from executing, at the second iteration, each of the set of shader operations based on the adjusted execution flow of the graphics workload.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5 is a diagram illustrating an example shader program in accordance with one or more aspects of this disclosure.

FIG. 8 is a diagram illustrating an example shader program according to one or more aspects.

DETAILED DESCRIPTION

Figure 1:
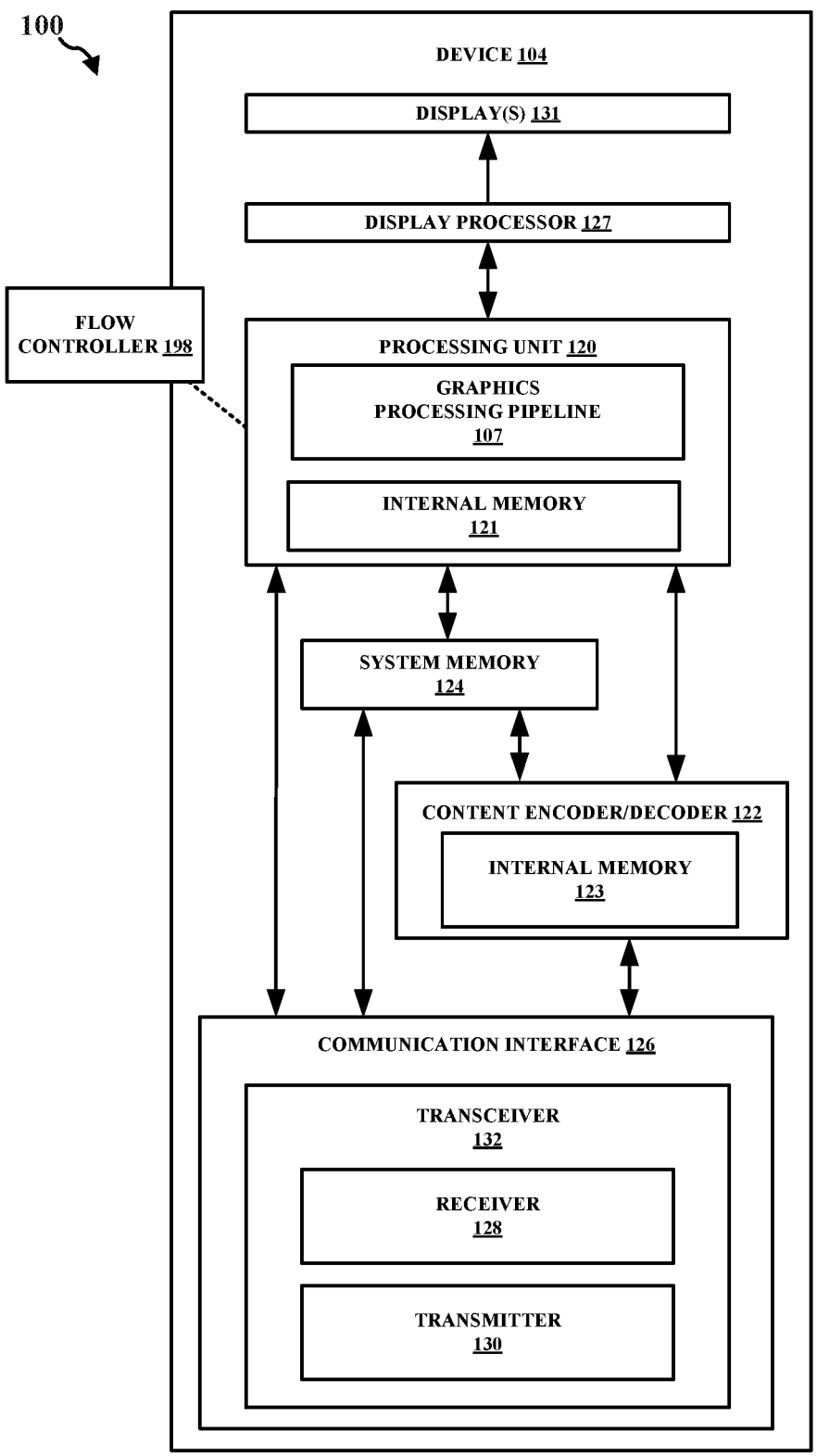
FIG. 1 is a block diagram that illustrates an example content generation system in accordance with one or more techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, processing systems, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOCs), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

The term application may refer to software. As described herein, one or more techniques may refer to an application (e.g., software) being configured to perform one or more functions. In such examples, the application may be stored in a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

In one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, instances of the term "content" may refer to "graphical content," an "image," etc., regardless of whether the terms are used as an adjective, noun, or other parts of speech. In some examples, the term "graphical content," as used herein, may refer to a content produced by one or more processes of a graphics processing pipeline. In further examples, the term "graphical content," as used herein, may refer to a content produced by a processing unit configured to perform graphics processing. In still further examples, as used herein, the term "graphical content" may refer to a content produced by a graphics processing unit.

In some use cases associated with graphics applications, the final result or the intermediate result of an operation (e.g., a "mix" operation) may depend on results from multiple possible previous operations. For example, for a result that may be calculated as result=a*b, each of the operands a and b may be generated based on one or more of a sample operation, a memory load operation, or a highly complex mathematical operation. In some cases, many operands for a multiplication operation may be equal to 0.0. Performing a texture fetch or other operations for other operands of the multiplication operation where one of the operands is equal to 0.0 may represent wasted time, energy, and execution resources.

One or more aspects may relate to runtime optimization of the shader execution flow. A graphics processor may obtain instruction execution data associated with a graphics workload, the instruction execution data including graphics data for a set of shader operations. The graphics processor may configure, at a first iteration, at least one predication value based on the instruction execution data including the graphics data for the set of shader operations. The at least one predication value may indicate a likelihood of an occurrence of a condition for the graphics workload. The condition for the graphics workload may be associated with a streaming processor of a GPU. The graphics processor may adjust, at a second iteration subsequent to the first iteration and without altering a function or a result of the graphics workload, an execution flow of the graphics workload based on the configured at least one predication value. The execution flow of the graphics workload may include the set of shader operations. The graphics processor may execute or refrain from executing, at the second iteration, each of the set of shader operations based on the adjusted execution flow of the graphics workload.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of a SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components (e.g., a communication interface 126, a transceiver 132, a receiver 128, a transmitter 130, a display processor 127, and one or more displays 131). Display(s) 131 may refer to one or more displays 131. For example, the display 131 may include a single display or multiple displays, which may include a first display and a second display. The first display may be a left-eye display and the second display may be a right-eye display. In some examples, the first display and the second display may receive different frames for presentment thereon. In other examples, the first and second display may receive the same frames for presentment thereon. In further examples, the results of the graphics processing may not be displayed on the device, e.g., the first display and the second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing using a graphics processing pipeline 107. The content encoder/decoder 122 may include an internal memory 123. In some examples, the device 104 may include a processor, which may be configured to perform one or more display processing techniques on one or more frames generated by the processing unit 120 before the frames are displayed by the one or more displays 131. While the processor in the example content generation system 100 is configured as a display processor 127, it should be understood that the display processor 127 is one example of the processor and that other types of processors, controllers, etc., may be used as substitute for the display processor 127. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 may be communicatively coupled to the system memory 124 over a bus. In some examples, the processing unit 120 and the content encoder/decoder 122 may be communicatively coupled to the internal memory 121 over the bus or via a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, static random access memory (SRAM), dynamic random access memory (DRAM), erasable programmable ROM (EPROM), EEPROM, flash memory, a magnetic data media or an optical storage media, or any other type of memory. The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a CPU, a GPU, GPGPU, or any other processing unit that may be configured to perform graphics processing. In some examples, the processing unit 120 may be integrated into a motherboard of the device 104. In further examples, the processing unit 120 may be present on a graphics card that is installed in a port of the motherboard of the device 104, or may be otherwise incorporated within a peripheral device configured to interoperate with the device 104. The processing unit 120 may include one or more processors, such as one or more microprocessors, GPUs, ASICs, FPGAs, arithmetic logic units (ALUs), DSPs, discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, and/or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a flow controller 198 configured to obtain instruction execution data associated with a graphics workload. The instruction execution data may include graphics data for a set of shader operations. The flow controller 198 may be configured to configure, at a first iteration, at least one predication value based on the instruction execution data including the graphics data for the set of shader operations. The at least one predication value may indicate a likelihood of an occurrence of a condition for the graphics workload. The condition for the graphics workload may be associated with a streaming processor of a GPU. The flow controller 198 may be configured to adjust, at a second iteration subsequent to the first iteration and without altering a function or a result of the graphics workload, an execution flow of the graphics workload based on the configured at least one predication value. The execution flow of the graphics workload may include the set of shader operations. The flow controller 198 may be configured to execute or refrain from executing, at the second iteration, each of the set of shader operations based on the adjusted execution flow of the graphics workload. Although the following description may be focused on graphics processing, the concepts described herein may be applicable to other similar processing techniques.

A device, such as the device 104, may refer to any device, apparatus, or system configured to perform one or more techniques described herein. For example, a device may be a server, a base station, a user equipment, a client device, a station, an access point, a computer such as a personal computer, a desktop computer, a laptop computer, a tablet computer, a computer workstation, or a mainframe computer, an end product, an apparatus, a phone, a smart phone, a server, a video game platform or console, a handheld device such as a portable video game device or a personal digital assistant (PDA), a wearable computing device such as a smart watch, an augmented reality device, or a virtual reality device, a non-wearable device, a display or display device, a television, a television set-top box, an intermediate network device, a digital media player, a video streaming device, a content streaming device, an in-vehicle computer, any mobile device, any device configured to generate graphical content, or any device configured to perform one or more techniques described herein. Processes herein may be described as performed by a particular component (e.g., a GPU) but in other embodiments, may be performed using other components (e.g., a CPU) consistent with the disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
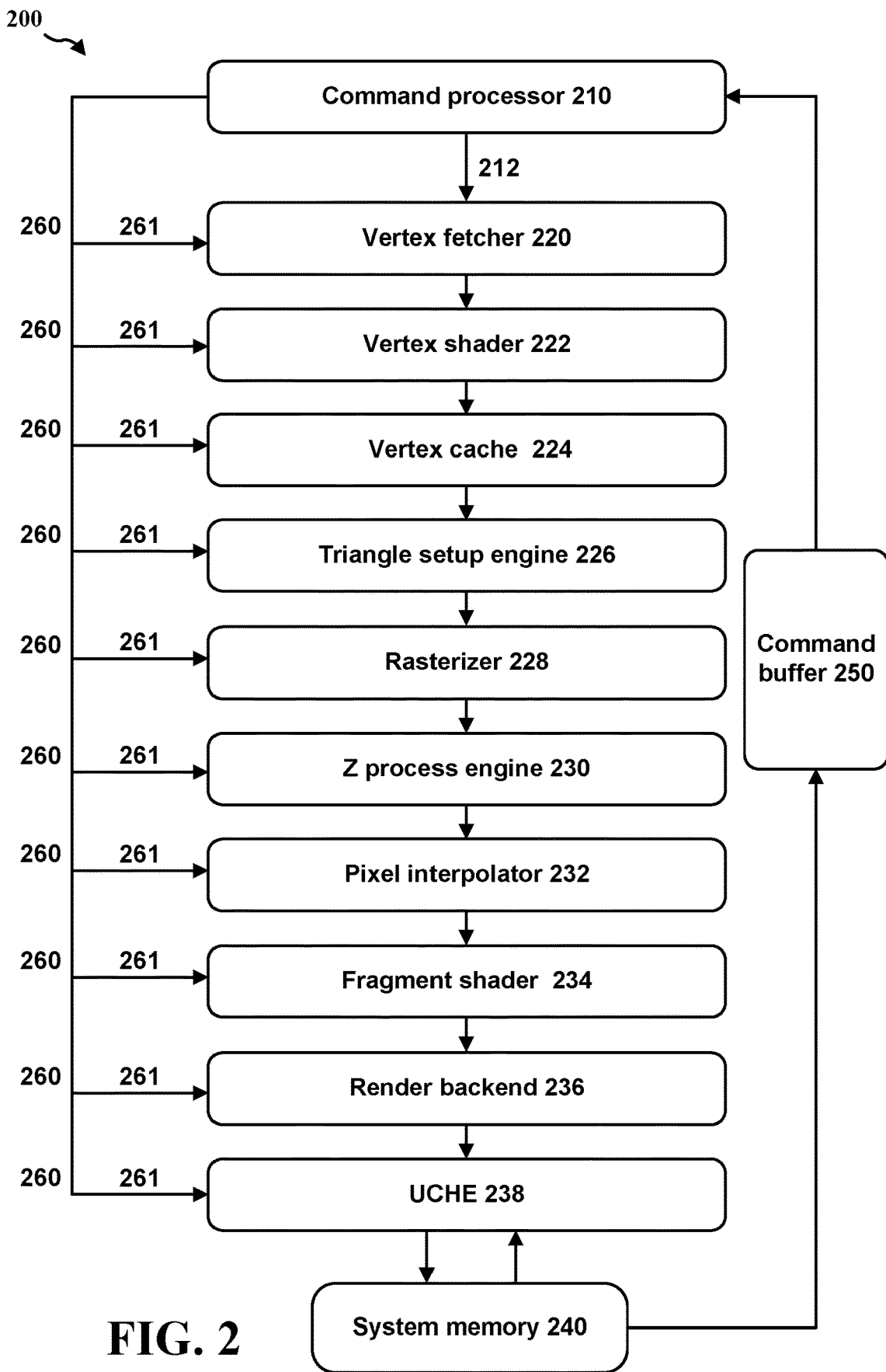
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call data packets 212 through separate paths to the processing units or blocks in the GPU. Further, the command buffer 250 can alternate different states of context registers and draw calls. For example, a command buffer can be structured in the following manner: context register of context N, draw call(s) of context N, context register of context N+1, and draw call(s) of context N+1.

Figure 3:
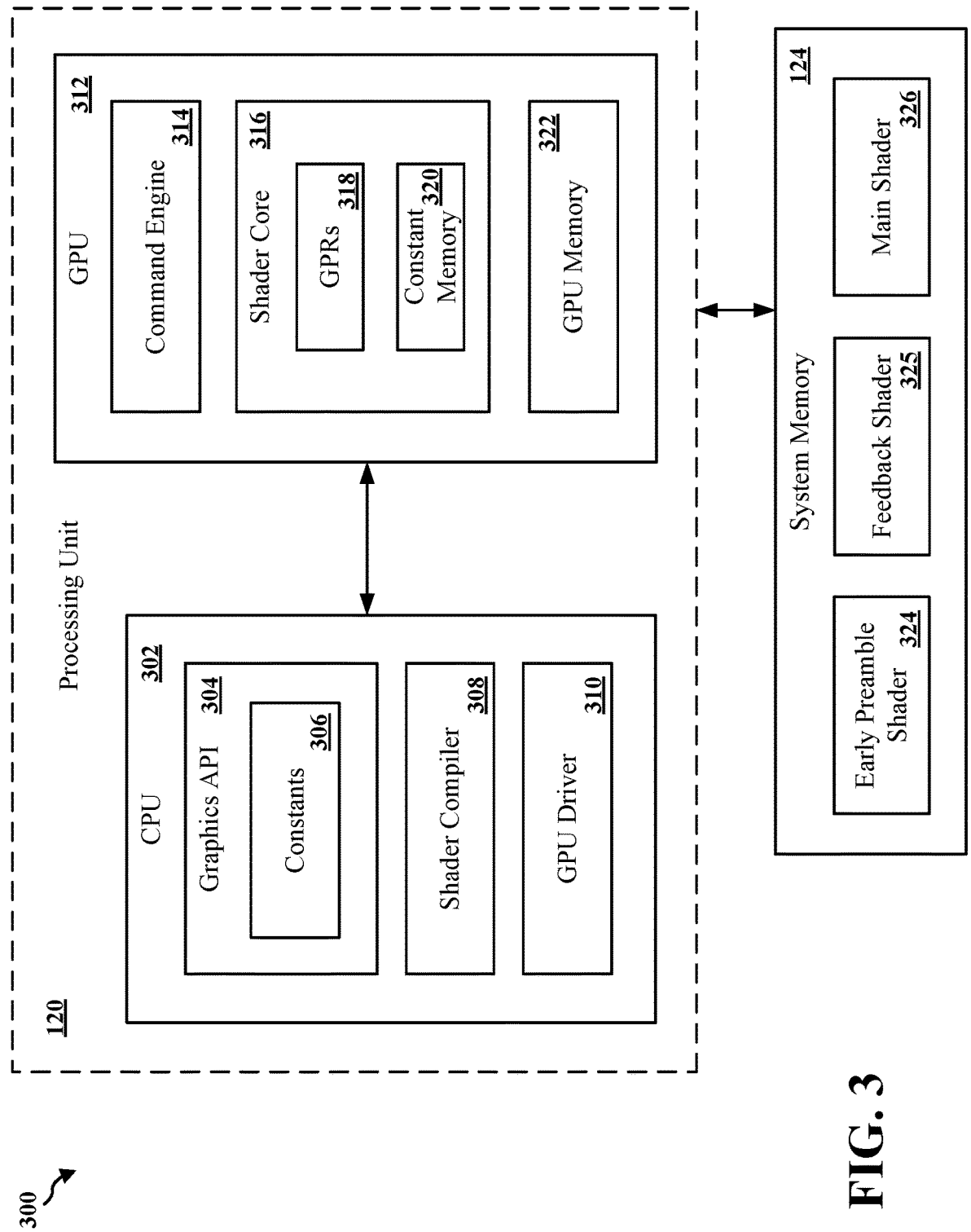
FIG. 3 is a diagram illustrating example components for processing data in accordance with one or more aspects of this disclosure.

FIG. 3 is a diagram 300 that illustrates exemplary components, such as the processing unit 120 and the system memory 124, as may be identified in connection with the device 104 for processing data, in accordance with one or more aspects of this disclosure. In aspects, the processing unit 120 may include a CPU 302 and a GPU 312. The GPU 312 and the CPU 302 may be formed as an integrated circuit (e.g., a system-on-a-chip (SOC)) and/or the GPU 312 may be incorporated onto a motherboard with the CPU 302. Alternatively, the CPU 302 and the GPU 312 may be configured as distinct processing units that are communicatively coupled to each other. For example, the GPU 312 may be incorporated on a graphics card that is installed in a port of the motherboard that includes the CPU 302.

The CPU 302 may be configured to execute a software application that causes graphical content to be displayed (e.g., on the display(s) 131 of the device 104) based on one or more operations of the GPU 312. The software application may issue instructions to a graphics application program interface (API) 304, which may be a runtime program that translates instructions received from the software application into a format that is readable by a GPU driver 310. After receiving instructions from the software application via the graphics API 304, the GPU driver 310 may control an operation of the GPU 312 based on the instructions. For example, the GPU driver 310 may generate one or more command streams that are placed into the system memory 124, where the GPU 312 is instructed to execute the command streams (e.g., via one or more system calls). A command engine 314 included in the GPU 312 is configured to retrieve the one or more commands stored in the command streams. The command engine 314 may provide commands from the command stream for execution by the GPU 312. The command engine 314 may be hardware of the GPU 312, software/firmware executing on the GPU 312, or a combination thereof. While the GPU driver 310 is configured to implement the graphics API 304, the GPU driver 310 is not limited to being configured in accordance with any particular API. The system memory 124 may store the code for the GPU driver 310, which the CPU 302 may retrieve for execution. In examples, the GPU driver 310 may be configured to allow communication between the CPU 302 and the GPU 312, such as when the CPU 302 offloads graphics or non-graphics processing tasks to the GPU 312 via the GPU driver 310.

The system memory 124 may further store source code for one or more of an early preamble shader 324, a feedback shader 325, or a main shader 326. In such configurations, a shader compiler 308 executing on the CPU 302 may compile the source code of the shaders 324-326 to create object code or intermediate code executable by a shader core 316 of the GPU 312 during runtime (e.g., at the time when the shaders 324-326 are to be executed on the shader core 316). In some examples, the shader compiler 308 may pre-compile the shaders 324-326 and store the object code or intermediate code of the shader programs in the system memory 124. The shader compiler 308 (or in another example the GPU driver 310) executing on the CPU 302 may build a shader program with multiple components including the early preamble shader 324, the feedback shader 325, and the main shader 326. The main shader 326 may correspond to a portion or the entirety of the shader program that does not include the preamble shader 324 or the feedback shader 325. The shader compiler 308 may receive instructions to compile the shader(s) 324-326 from a program executing on the CPU 302. The shader compiler 308 may also identify constant load instructions and common operations in the shader program for including the common operations within the early preamble shader 324 (rather than the main shader 326). The shader compiler 308 may identify such common instructions, for example, based on (presently undetermined) constants 306 to be included in the common instructions. The constants 306 may be defined within the graphics API 304 to be constant across an entire draw call. The shader compiler 308 may utilize instructions such as a preamble shader start to indicate a beginning of the early preamble shader 324 and a preamble shader end to indicate an end of the early preamble shader 324. Similar instructions may be used for the feedback shader 325 and the main shader 326. The feedback shader 325 will be described in further detail below.

The shader core 316 included in the GPU 312 may include general purpose registers (GPRs) 318 and constant memory 320. The GPRs 318 may correspond to a single GPR, a GPR file, and/or a GPR bank. Each GPR in the GPRs 318 may store data accessible to a single thread. The software and/or firmware executing on GPU 312 may be a shader program 324-326, which may execute on the shader core 316 of GPU 312. The shader core 316 may be configured to execute many instances of the same instructions of the same shader program in parallel. For example, the shader core 316 may execute the main shader 326 for each pixel that defines a given shape. The shader core 316 may transmit and receive data from applications executing on the CPU 302. In examples, constants 306 used for execution of the shaders 324-326 may be stored in a constant memory 320 (e.g., a read/write constant RAM) or the GPRs 318. The shader core 316 may load the constants 306 into the constant memory 320. In further examples, execution of the early preamble shader 324 or the feedback shader 325 may cause a constant value or a set of constant values to be stored in on-chip memory such as the constant memory 320 (e.g., constant RAM), the GPU memory 322, or the system memory 124. The constant memory 320 may include memory accessible by all aspects of the shader core 316 rather than just a particular portion reserved for a particular thread such as values held in the GPRs 318.

Figure 4:
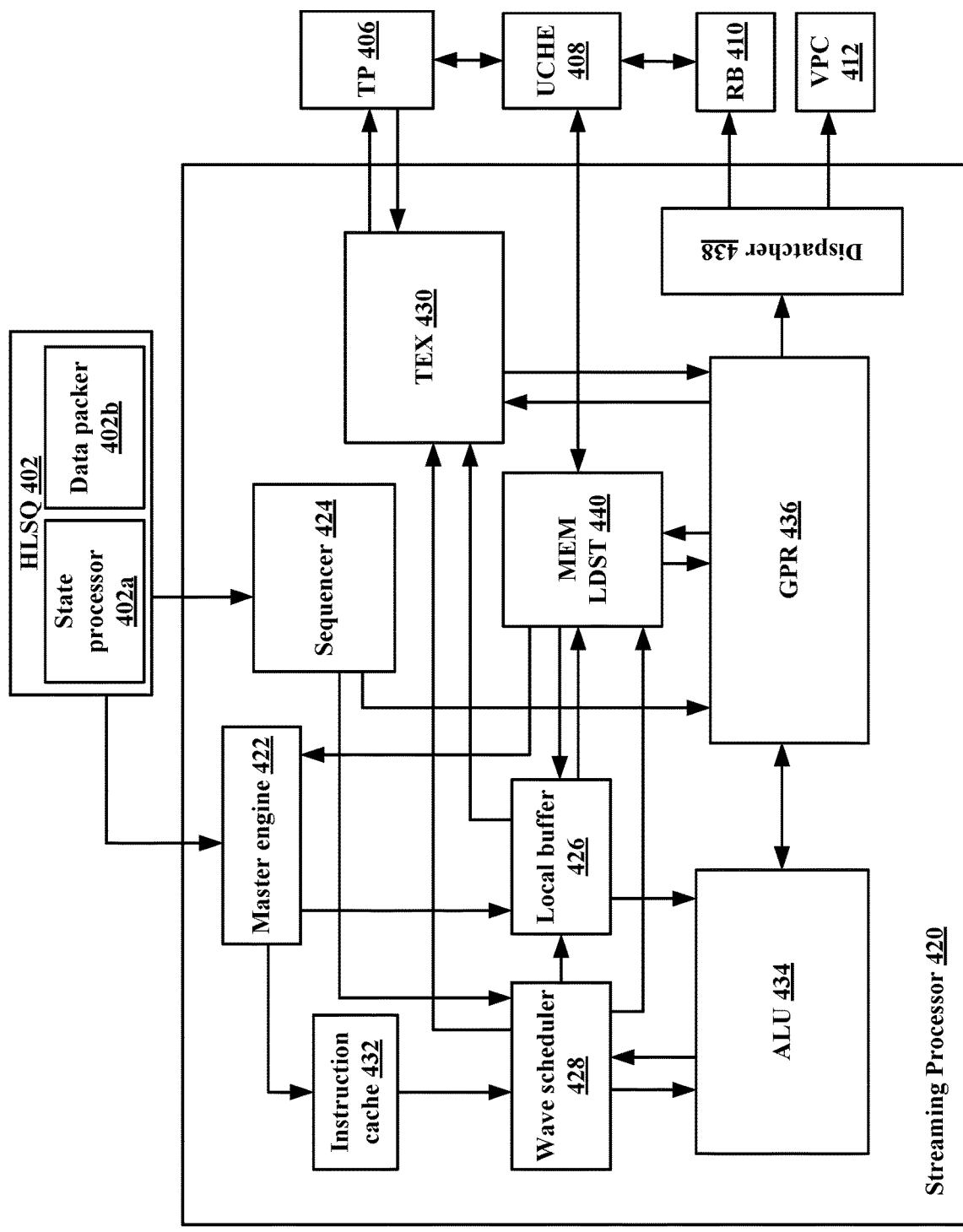
FIG. 4 is a diagram illustrating an example GPU in accordance with one or more aspects of this disclosure.

FIG. 4 illustrates an example GPU 400 in accordance with one or more aspects of this disclosure. Specifically, FIG. 4 illustrates a streaming processor (SP) system in GPU 400. As shown in FIG. 4, GPU 400 includes a high level sequencer (HLSQ) 402, texture processor (TP) 406, level 2 cache (UCHE) 408, render backend (RB) 410, and vertex cache (VPC) 412. GPU 400 also includes SP 420, master engine 422, sequencer 424, local buffer 426, wave scheduler 428, texture sample instruction decoder/controller (TEX) 430, instruction cache 432, arithmetic logic unit (ALU) 434, GPR 436, dispatcher 438, and memory (MEM) load store (LDST) 440.

As shown in FIG. 4, each unit or block in GPU 400 may send data or information to other blocks. For instance, HLSQ 402 may send commands to the master engine 422. Also, HLSQ 402 may send vertex threads, vertex attributes, pixel threads, pixel attributes, and/or compute commands to the sequencer 424. TP 406 may receive texture requests from TEX 430, and send texture elements (texels) back to the TEX 430. Further, TP 406 may send memory read requests to and receive memory data from UCHE 408. UCHE 408 may also receive memory read or write requests from MEM LDST 440 and send memory data back to MEM LDST 440, as well as receive memory read or write requests from RB 410 and send memory data back to RB 410. Also, RB 410 may receive an output in the form of color from GPR 436, e.g., via dispatcher 438. VPC 412 may also receive output in the form of vertices from GPR 436, e.g., via dispatcher 438. GPR 436 may send address data or receive write back data from MEM LDST 440. GPR 436 may also send temporary data to and receive temporary data from ALU 434. Moreover, ALU 434 may send address or predicate information to the wave scheduler 428, as well as receive instructions from wave scheduler 428. Local buffer 426 may send constant data to ALU 434. TEX 430 may also receive texture attributes from or send texture data to GPR 436, as well as receive constant data from local buffer 426. Further, TEX 430 may receive texture requests from wave scheduler 428, as well as receive constant data from local buffer 426. MEM LDST 440 may send/receive constant data to/from local buffer 426. Sequencer 424 may send wave data to wave scheduler 428, as well as send data to GPR 436. The sequencer 424 may allocate resources and local memory. Also, the sequencer 424 may allocate wave slots and any associated GPR 436 space. For example, the sequencer 424 may allocate wave slots or GPR 436 space when the HLSQ 402 issues a pixel tile workload to the SP 420. Master engine 422 may send program data to instruction cache 432, as well as send constant data to local buffer 426 and receive instructions from MEM LDST 440. Instruction cache 432 may send instructions or decode information to wave scheduler 428. Wave scheduler 428 may send read requests to local buffer 426, as well as send memory requests to MEM LDST 440.

As further shown in FIG. 4, the HLSQ 402 may prepare one or more context states for the SP 420. For example, the HLSQ 402 may prepare the context states for different types of data, e.g., global register data, shader constant data, buffer descriptors, instructions, etc. Additionally, the HLSQ 402 may embed context states into a command stream to the SP 420. The master engine 422 may parse the command stream from the HLSQ 402 and setup an SP global state. Moreover, the master engine 422 may fill or add to an instruction cache 432 and/or a local buffer 426 or a constant buffer. In some aspects, inside the HLSQ 402, there may be an internal function unit called a state processor 402*a*. The state processor 402*a* may be a single fiber scalar processor that may execute a special shader program, e.g., a preamble shader. The preamble shader may be generated by the GPU compiler in order to load constant data from different buffer objects. Also, the preamble shader may bind the buffer objects into a single constant buffer, such as a post-process constant buffer. Further, the HLSQ 402 may execute the preamble shader and, as a result, skip utilizing a main shader. In some instances, the main shader may perform different shading tasks, such as normal vertex shading and/or a fragment shading program. Moreover, the HLSQ 402 may include a data packer 402*b*.

Additionally, as shown in FIG. 4, the SP 420 may not be limited to executing a preamble if the HLSQ 402 decides to skip a preamble execution. For instance, the SP 420 may also process a conventional graphics workload, such as vertex shading and/or fragment shading. In some aspects, the SP 420 may utilize its execution units and storage in order to process compute tasks as a general purpose GPU (GPGPU). Inside the SP 420, there may be multiple parallel instruction execution units such as an ALU, elementary function unit (EFU), branching unit, TEX, general memory read and write (aka LDST), etc. The SP 420 may also include on-chip storage memory, such as a GPR 436 which may store per-fiber private data. Also, the SP 420 may include a local buffer 426 which stores per-shader or per-kernel constant data, per-wave uniform data (aka uGPR), and per-compute work group (WG) local memory (LM). Processing a preamble shader may take up one wave slot. Further, the majority of preamble shaders may use just the uGPR and not the GPR, and may execute ALU instructions on a scalar ALU. Therefore, execution of the preamble shader may be associated with high performance, and may be power efficient because any available wave slot may be used to execute the preamble shader even without GPR space allocation.

Moreover, as shown in FIG. 4, dispatcher 438 may fetch data from GPR 436. Dispatcher 438 may also perform format conversion, and then dispatch a final color to multiple render targets (RTs). Each RT may have one or more components, such as red (r) green (G) blue (B) alpha (A) (RGBA) data, or just an alpha component of the RGBA data. Further, each RT may be generally stored in a vector GPR, i.e., R3.0 may store red data, R3.1 may store green data, R3.2 may store blue data, etc. Also, a driver program in an SP context register may be utilized to define the GPR identifier (ID) which stores RT data.

In some use cases associated with graphics applications, the final result or the intermediate result of an operation (e.g., a "mix" operation, that is, a two-factor multiplication, i.e., A*B) may depend on results from multiple possible previous operations. For example, for a result that may be calculated as result=a*b, each of the operands a and b may be generated based on one or more of a sample operation, a memory load operation, or a highly complex mathematical operation. In some cases, many operands for a multiplication operation may be equal to 0.0. Performing a texture fetch (for the texture fetch operation, the SP may issue a sample instruction to the TP, and the TP may read the texture buffer, perform filtering, and return the result to the SP) or other operations for other operands of the multiplication operation where one of the operands is equal to 0.0 may represent wasted time, energy, and execution resources.

FIG. 5 is a diagram illustrating an example shader program 500 in accordance with one or more aspects of this disclosure. As shown at lines 17 and 18 in FIG. 5, the result of the variable output.xyz may depend on the values of 4 products (results of multiplication operations) where each of the 4 products involves multiplying an illumination value by a radius value. Further, the illumination and radius values may be results from texture fetching and post processing operations.

Figure 6B:
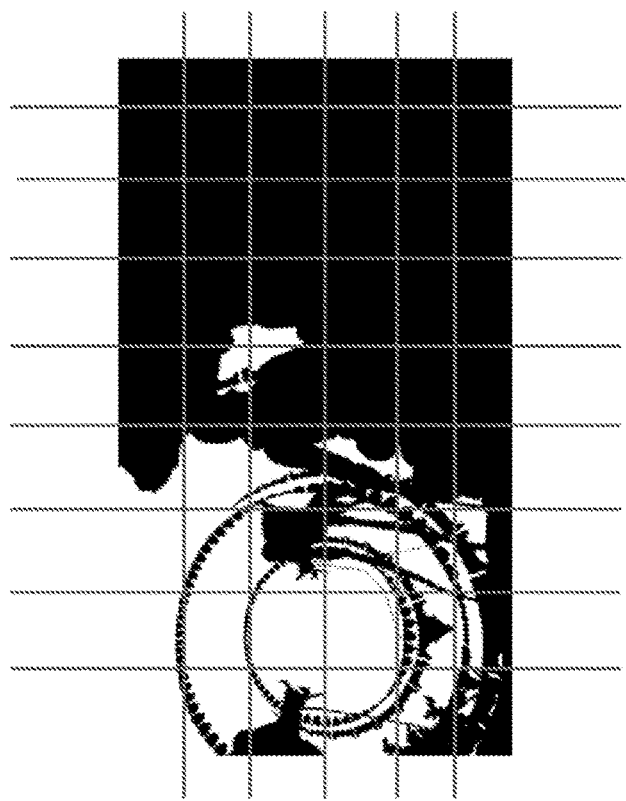
FIG. 6B is a diagram illustrating an example tiled radius value map according to one or more aspects.
Figure 6A:
FIG. 6A is a diagram illustrating an example radius value map in accordance with one or more aspects of this disclosure.

FIG. 6A is a diagram illustrating an example radius value map 600 in accordance with one or more aspects of this disclosure. The illustrated example radius values may correspond to inputs associated with the shader program in FIG. 5. In the example illustrated in FIG. 6A, all radius (component) values may be similar. In particular, the radius value may be 0.0 where the radius value map 600 is dark (black in color). Accordingly, in light (non-black) areas of the radius value map 600, the radius value may not be 0.0. Therefore, for the light areas, it may be beneficial to fetch both the illumination texture and the radius texture as one group in order to reduce texture fetch latency. On the other hand, for the dark areas, it may be beneficial to issue the radius texture first. Then, once the radius value is confirmed as being equal to 0.0, the corresponding illumination texture fetch and subsequent post processing may be skipped because the product is known to be 0.0 irrespective of the actual illumination value. Therefore, by skipping the texture fetch the subsequent post processing associated with the illumination texture, an amount of workload may be reduced and performance may be improved at a GPU.

FIG. 6B is a diagram illustrating an example tiled radius value map 650 according to one or more aspects. In the tiled radius value map 650, each tile may include a large number (e.g., hundreds of thousands) of pixels that may be dispatched to one or more SPs. Each tile may be further divided into sub-tiles (also referred to as batches) (e.g., each batch may include 1000 pixels), such that for a sub-tile that is majority light (e.g., >50% light, >60% light, etc.), the SP may collect a radius value profile (the profile may indicate whether the radius values are equal to 0.0 and for a majority light sub-tile the indication may be negative) at one batch (e.g., batch N), and may predicate based on the radius value profile that for the next batch (e.g., batch N+1), because the radius value profile may indicate that the pixels in the next batch are more likely to be light, it may be beneficial to issue all sample (texture fetch) instructions for both illumination and radius as a group so that the memory fetch latency may be reduced or minimized. On the other hand, in a majority dark (e.g., >50% dark, >60% dark, etc.) sub-tile, the SP may also collect a radius value profile (the profile may indicate whether the radius values are equal to 0.0 and for a majority dark sub-tile the indication may be positive) at one batch (e.g., batch M), and may predicate based on the radius value profile that for the next batch (e.g., batch M+1), because the radius value profile may indicate that the pixels in the next batch are more likely to be dark, it may be beneficial to process the radius texture first, generate a pixel execution deactivation mask based on the radius texture (the mask may deactivate further pixel illumination operations where the radius value associated with the pixel is equal to 0.0), and skip the corresponding pixel illumination operation based on the pixel execution deactivation mask.

That textures of pixels that are close to each other may be correlated may be referred to as spatial coherency. In one or more aspects, hardware and software adaptations may be made to utilize spatial coherency to predicate an optimized shader execution flow. Within the GPU hardware, the SP may be configured to collect instruction execution feedback and generate a feedback predication. The power and/or chip area impact associated with the feedback collection and predication generation functionality may be minimized. In one or more configurations, the zero value detection logic within the floating multiply (FMUL) (i.e., a multiplication of floating numbers) unit (the zero value detection logic may help to skip the multiplication operation to save power in case any operand of FMUL equals 0.0) in the SP single instruction multiple data (SIMD) ALU may be repurposed to operate as a feedback strobe, so that the number of texture values (e.g., illumination or radius values) that are equal to 0.0 may be tallied (accumulated). To be more specific, the feedback strobe may refer to feedback logic that may collect samples of the 0.0 texture value from multiply unit (e.g., the FMUL unit) input operands. The tally of the 0.0 texture value for a batch may be used to generate the texture value profile for the batch.

Further, in one or more configurations, by utilizing the existing preamble shader scheme, the SP may generate the feedback predication through the execution of a feedback shader (e.g., feedback shader 325).

In one or more configurations, a predication sample interval may be defined. Accordingly, the predication generation may be based on the sample interval, where each sample interval may correspond to a batch (e.g., a batch of waves). In one or more configurations, the sample interval or batch may be specified in a number of waves (e.g., 16 waves, or equivalent sample instances) (a wave may be a collection of threads, such as pixels, vertexes, or work items).

In one or more configurations, a predication generated based on the feedback collected in a current batch may be used to optimize the shader program execution flow for one or more of the next batches. In one or more configurations, feedback collected from one previous batch or multiple previous batches (e.g., 2-4 previous batches) may be used to generate the predication for a subsequent batch. In one configuration, the GPU may assign different weights to the feedback collected in different previous batches, where older batches may be assigned lower weights, so that the feedback collected from older batches may have less influence on the execution flow of the subsequent batch. For example, if feedback collected from 4 previous batches are used, the batch N−3 (i.e., 3 batches before the current batch) may be assigned a weight of ⅛, the batch N−2 (i.e., 2 batches before the current batch) may be assigned a weight of ¼, the batch N−1 (i.e., the batch immediately before the current batch) may be assigned a weight of ⅝, and the batch N (the current batch) may be assigned a weight of 1.

In one or more configurations, the compiler (e.g., the shader compiler 308) may specify (designated) instruction operands to collect feedback. Accordingly, the compiled shader program may utilize the hardware generated feedback predication to optimize the shader program execution flow on a batch-to-batch basis. Herein a shader program may refer to a user-defined program that may run on one or more stages of a graphics processor.

Figure 7:
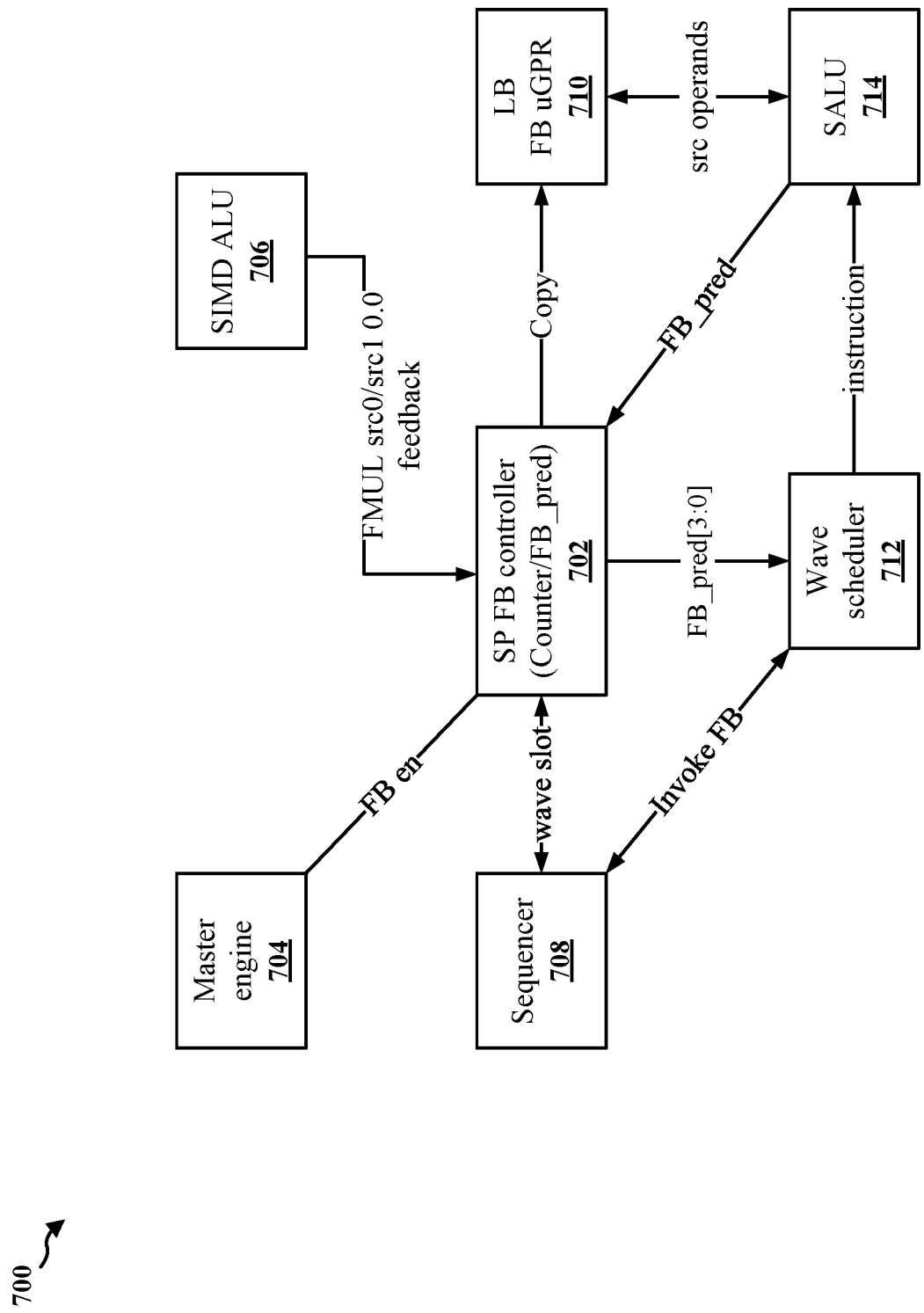
FIG. 7 is a block diagram illustrating an example process of shader program execution flow optimization in accordance with one or more aspects of this disclosure.

FIG. 7 is a block diagram illustrating an example process 700 of shader program execution flow optimization in accordance with one or more aspects of this disclosure. A feedback (FB) controller 702 may be provided in the SP. In particular, the FB controller 702 may include one or more sets of counters (FB_counter) (e.g., 8 counters per set including FB_counter[0] to FB_counter[7], where each counter may include 32 bits (e.g., bits [31:0])) and one or more sets of context registers (FB_pred) (e.g., 4 bits per set) for each shader slot to accommodate the execution of multiple shader programs at the SP in parallel. The master engine 704 may instruct the FB controller 702 to enable feedback collection and predication value computation. At wave inception, each SP wave slot (Hwave) (i.e., hardware storage and associated logic for a wave to store states from shader program execution) or execution slot (Eslot) (i.e., hardware logic for a wave to execute the shader program) (when a shader program is to be executed, the SP may assign a execution slot to install shader program states and execute the shader program) may duplicate the predication values. Herein a predication value may be a logic value generated from the shader program execution profiling result, and may often be a single bit, that is, 0 or 1. stored at context registers FB_pred. In other words, the value of the context registers FB_pred may be copied to ensure the value is consistent during the entire wave execution cycle.

In one example configuration, the SP (in particular, the FB controller 702) may use the counter FB_counter[0] to collect the count of instances where the illumination value is equal to 0.0 (in the example, the illumination value may be from the FMUL source operand 0 (src0) at the SIMD ALU 706), and may use the counter FB_counter[1] to collect the count of instances where the radius value is equal to 0.0 (in the example, the radius value may be from the FMUL source operand 1 (src1) at the SIMD ALU 706), and may use the counter FB_counter[2] to collect the count of instances where the designated multiplication operation (i.e., output=illumination*radius) is executed. Further, in this example, each batch may include 16 waves. In other words, the sample interval (SAMPLE_INTERVAL) may be 16 waves.

Accordingly, once a wave starts execution, the SP may detect instances where one or both of the operands of the designated FMUL instruction/operation (illumination*radius) are equal to 0.0, and may update the counters FB_counter[0] and FB_counter[1] accordingly. Further, the SP may increment the counter FB_counter[2] by 1 each time the designated FMUL instruction/operation (illumination*radius) is executed. Therefore, the FB controller 702 may detect the end of a batch based on the value of the counter FB_counter[2] reaching 16. Upon detecting the end of a batch, the FB controller 702 may request that the sequencer 708 of the SP allocate an empty wave slot where the feedback shader may be executed. Further, the FB controller 702 may copy the values of counters FB_counter [n] (e.g., FB_counter[0] and FB_counter[1]) to the corresponding uGPR 710 (e.g., uGPR[n]), and may reset the counters FB_counter[n] (e.g., FB_counter[0] to FB_counter [2]) to 0, so the counters FB_counter[n] may be ready for the profile data collection for a next batch. Next, the wave scheduler 712 of the SP may execute the feedback shader, which may include issuing scalar instructions to the scalar ALU (SALU) 714, where the predication value FB_pred may be computed. Once the context register FB_pred is updated at the FB controller 702, the wave scheduler 712 may surrender the wave slot associated with the feedback shader. Thereafter, at the inception of a new wave, the wave slot may read (sample) the current value of the per shader slot context register FB_pred from the FB controller 702, and may copy the value to a per wave slot FB_pred context register to ensure consistency throughout the wave execution cycle.

In one or more configurations, the compiler may append the feedback shader after the early preamble shader, and may use the feedback shader start (FBSS) and feedback shader end (FBSE) instruction pair to indicate the start and the end of the feedback shader. As the feedback shader is part of the shader code, the compiler may store the feedback shader offset in a context register to indicate to the GPU hardware the memory location where the feedback shader may be fetched. Below is an example shader structure, where the double forward slash (//) may be followed by a comment or an explanation.

| | |
|---|---|
| shs | //early preamble (EP) SHader Start |
| {EP} | //EP |
| she | //EP SHader End |
| FBSS | //FB shader (FBS) start, FBS_offset pointer |
| {FBS} | //FBS |
| FBSE | //FBS end |
| {Main} | //Main shader |

Moreover, instructions for executing the feedback shader are summarized in the Table 1 below. Further, the SALU 714 may be configured to enable the SALU 714 to write the feedback predication value (i.e., FB_pred value) to the context register FB_pred at the FB controller 702.

TABLE 1

Instructions for Feedback Shader

| Instruction | Function |
|---|---|
| pred_FB_true, pred_FB_false, pred_FB_end | branching instructions based on the predication value FB_pred |
| collect_FB | indicates zero value operand(s) feedback collection from the subsequent instruction |
| store_FB | stores the shader unique ID and the shader feedback data to the driver allocated feedback data memory (e.g., from uGPR(s)) |

FIG. 8 is a diagram illustrating an example shader program 800 according to one or more aspects. The execution flow of the shader program 800 may be adjusted based on the predication values. In particular, the subroutine Label_PROG_A (lines 31-41 in FIG. 8) may relate to the texture fetch and post processing operations for the radius texture. The subroutine Label_PROG_B (lines 43-48) may relate to the texture fetch operations for the illumination texture. Further, the subroutine label_PROG_C (lines 50-55) may relate to the calculation of the final outputs, where the designated FMUL operation is performed at lines 52-53. The feedback may be collected at line 51 using the instruction collect_FB.

Based on the code at lines 6-13, if it is determined at line 7 that the predication value relating to the illumination texture (FB_pred[0]) is 1 (which may indicate that in a significant number of instances the illumination value was equal to 0.0 in one or more previous batches), and at line 9 that the illumination value for the present pixel is equal to 0.0, the subroutine Label_PROG_B relating to the texture fetch operations for the illumination texture may be skipped.

Moreover, if it is determined at line 7 the predication value relating to the illumination texture (FB_pred[0]) is 0 (which may indicate that in few or no instances the illumination value was equal to 0.0 in one or more previous batches), the program may jump to the subroutine Label_PASS1 (lines 15-23), where if it is determined at line 17 that the predication value relating to the radius texture (FB_pred [1]) is 1 (which may indicate that in a significant number of instances the radius value was equal to 0.0 in one or more previous batches), and at line 19 that the radius value for the present pixel is equal to 0.0, the subroutine Label_PROG_A relating to the texture fetch and post processing operations for the radius texture may be skipped.

Furthermore, if it is determined at line 17 that the predication value relating to the radius texture (FB_pred[1]) is 0 (which may indicate that in few or no instances the radius value was equal to 0.0 in one or more previous batches), the program may jump to the subroutine Label_PASS2 (lines 25-29). Under the control of subroutine Label_PASS2, all the subroutines Label_PROG_A, Label_PROG_B, and label_PROG_C may be executed, in that order. Therefore, the example shader program 800 shows that a predication result from a previous batch may change the execution flow of the shader program for the next batch. The example shader program 800 may be functionally equivalent to the example shader program 500 in FIG. 5. However, based the optimized execution flow, the example shader program 800 may be executed in a more resource efficient manner than the example shader program 500 in FIG. 5.

In one or more configurations, the compiler may generate the store_FB instructions in the feedback shader start. The SP hardware may incrementally write the feedback data from uGPR to driver allocated memory. The driver (e.g., the GPU driver 310) may analyze the feedback data to recompile the shader and update the shader with an optimized execution flow based on specific operand feedback data. Alternatively, in some configurations, the compiler may simply disable the feedback shader execution if there is no optimization opportunity.

In one or more configurations, the compiler may utilize the SEID ALU FMUL operand 0.0 detection logic to detect any specified value (e.g., to detect whether the value of the register R0.0 is equal to 1.0) based on detecting whether the difference between the register value and the specified value is equal to 0.0. For example, to detect whether the value of the register R0.0 is equal to 1.0, the compiler may generate the instruction sequence below

```
Fadd R1.0, R0.0, -1.0;    //store (value of R0.0 + (-1.0)) into R1.0
Collect_FB;
Fmul R63.0, R1.0, R1.0;   //write to dummy register (no write)
                          //invoke FMUL operand 0.0 detection logic
```

Accordingly, the above code may be used to collect a wide range of feedback from the initial profile. Then, some or all of the feedback collection code may be eliminated after the driver has collect the feedback and recompiled the shader code.

Therefore, one or more aspects may relate to compiler execution sequence optimization based on the hardware enabled dynamic feedback result. The data pattern may be analyzed and leveraged so that redundant or unneeded shader operations may be skipped. Further, different SPs or different batches of one SP may execute different shader sequences. This is more efficient than using the static execution flow across all SPs. The chip area and power overhead cost may be negligible. For example, if the first batch including 1000 pixels is majority light, the feedback predication value may be false ('0'). Then, for the second batch including 1000 pixels, the shader program may issue the texture instructions together to calculate illumination and radius values. On the other hand, if the first batch is majority dark, the feedback predication value may be true ('1'). Accordingly, for the second batch, the shader program may issue the texture instruction to calculate the radius. If the radius value is not zero, then the shader program may issue the texture sample instruction to fetch the illumination data. If the radius value is zero, the texture sample instruction may be skipped.

Figure 9:
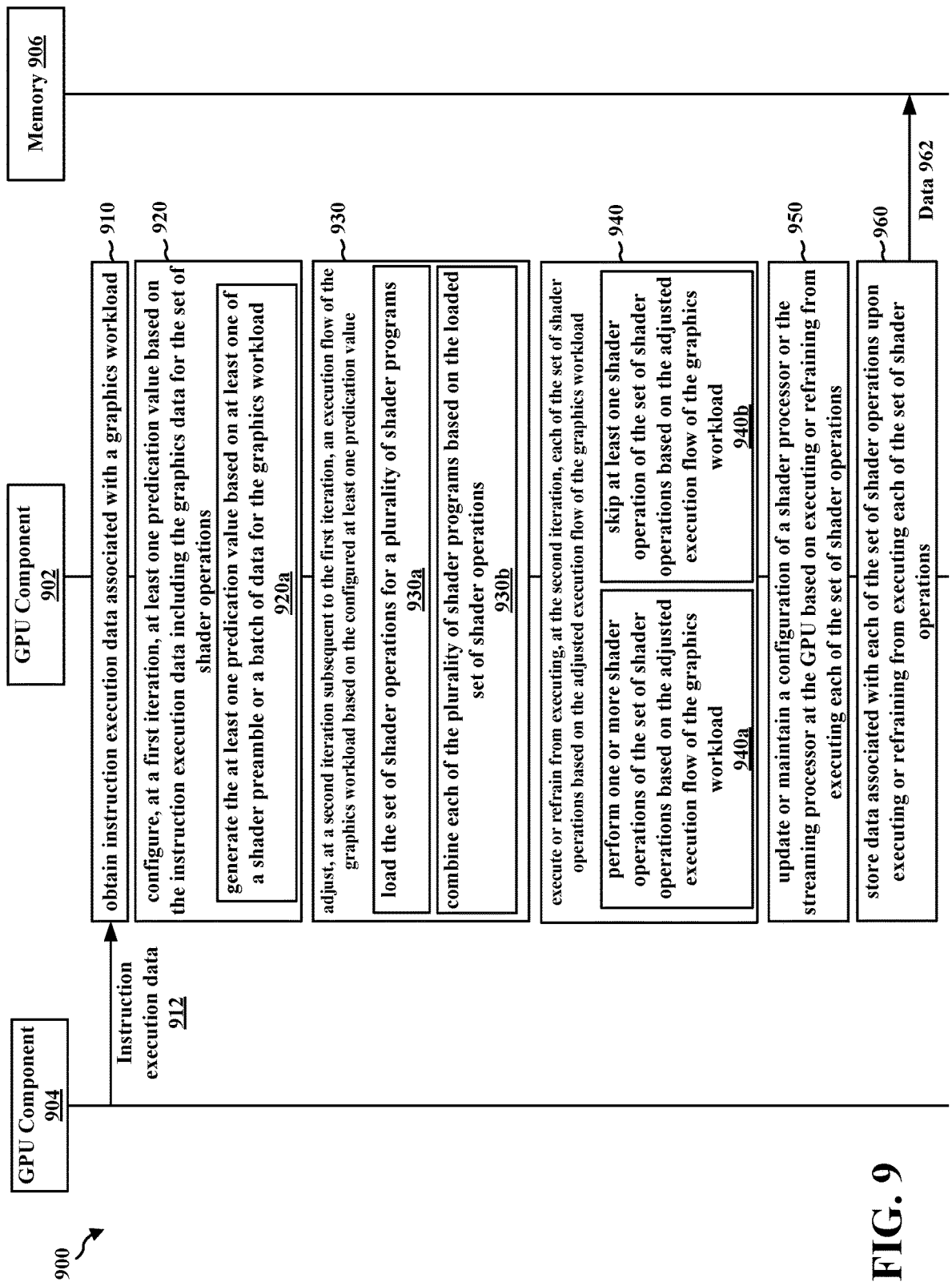
FIG. 9 is a call flow diagram illustrating example communications between a first GPU component, a second GPU component, and a memory in accordance with one or more techniques of this disclosure.

FIG. 9 is a call flow diagram 900 illustrating example communications between a GPU component 902, a GPU component 904, and a memory 906 in accordance with one or more techniques of this disclosure. At 910, the GPU component 902 may obtain instruction execution data 912 (the result from shader instruction execution) (e.g., feedback data) associated with a graphics workload (a collection of pixels or vertexes from a 3D draw call or a collection of work items from a compute kernel of the graphics processor) (e.g., vertex shading, fragment shading, etc.) from a GPU component 904. The instruction execution data may include graphics data for a set of shader operations (shader program execution).

In one configuration, the graphics data for the set of shader operations may include at least one of: lighting data, illumination data, depth data, shadow data, or radius data.

In one configuration, the instruction execution data may be obtained based on an FMUL unit of the GPU. The at least one predication value configured at the first iteration may indicate the likelihood of the occurrence of the condition for the graphics workload for the second iteration.

In one configuration, the set of shader operations may include a set of multiplication operations for the graphics workload.

At 920, the GPU component 902 may configure, at a first iteration (i.e., a first batch), at least one predication value based on the instruction execution data including the graphics data for the set of shader operations. The at least one predication value may indicate a likelihood of an occurrence of a condition for the graphics workload (e.g., the likelihood of the radius value being 0.0 for a batch). The condition for the graphics workload may be associated with a streaming processor of a GPU.

At 920a, to configure the at least one predication value, the GPU component 902 may generate the at least one predication value based on at least one of a shader preamble, a feedback shader, or a batch of data for the graphics workload.

In one configuration, the at least one predication value may be a 1-bit value. For example, the 1-bit value may indicate whether the likelihood of an occurrence of a condition is greater than a threshold likelihood.

At 930, the GPU component 902 may adjust, at a second iteration (i.e., a second batch) subsequent to the first iteration and without altering a function or a result of the graphics workload, an execution flow of the graphics workload based on the configured at least one predication value. The execution flow of the graphics workload may include the set of shader operations.

At 930a, to adjust the execution flow of the graphics workload, the GPU component 902 may load the set of shader operations for a plurality of shader programs.

At 930b, the GPU component 902 may combine each of the plurality of shader programs based on the loaded set of shader operations (e.g., the compiler may append the feedback shader after the early preamble shader).

In one configuration, the execution flow of the graphics workload may correspond to a shader sequence for the plurality of shader programs.

At 940, the GPU component 902 may execute or refrain from executing, at the second iteration, each of the set of shader operations based on the adjusted execution flow of the graphics workload.

At 940a, to execute each of the set of shader operations, the GPU component 902 may perform one or more shader operations of the set of shader operations based on the adjusted execution flow of the graphics workload.

At 940b, to refrain from executing each of the set of shader operations, the GPU component 902 may skip at least one shader operation of the set of shader operations based on the adjusted execution flow of the graphics workload.

At 950, the GPU component 902 may update or maintain a configuration of a shader processor or the streaming processor at the GPU based on executing or refraining from executing each of the set of shader operations.

At 960, the GPU component 902 may store data 962 (e.g., feedback data) associated with each of the set of shader operations to a memory 906 upon executing or refraining from executing each of the set of shader operations.

In one configuration, the data 962 may be stored in at least one of: a system memory, a double data rate (DDR) RAM, a constant memory, or an on-chip memory.

Figure 10:
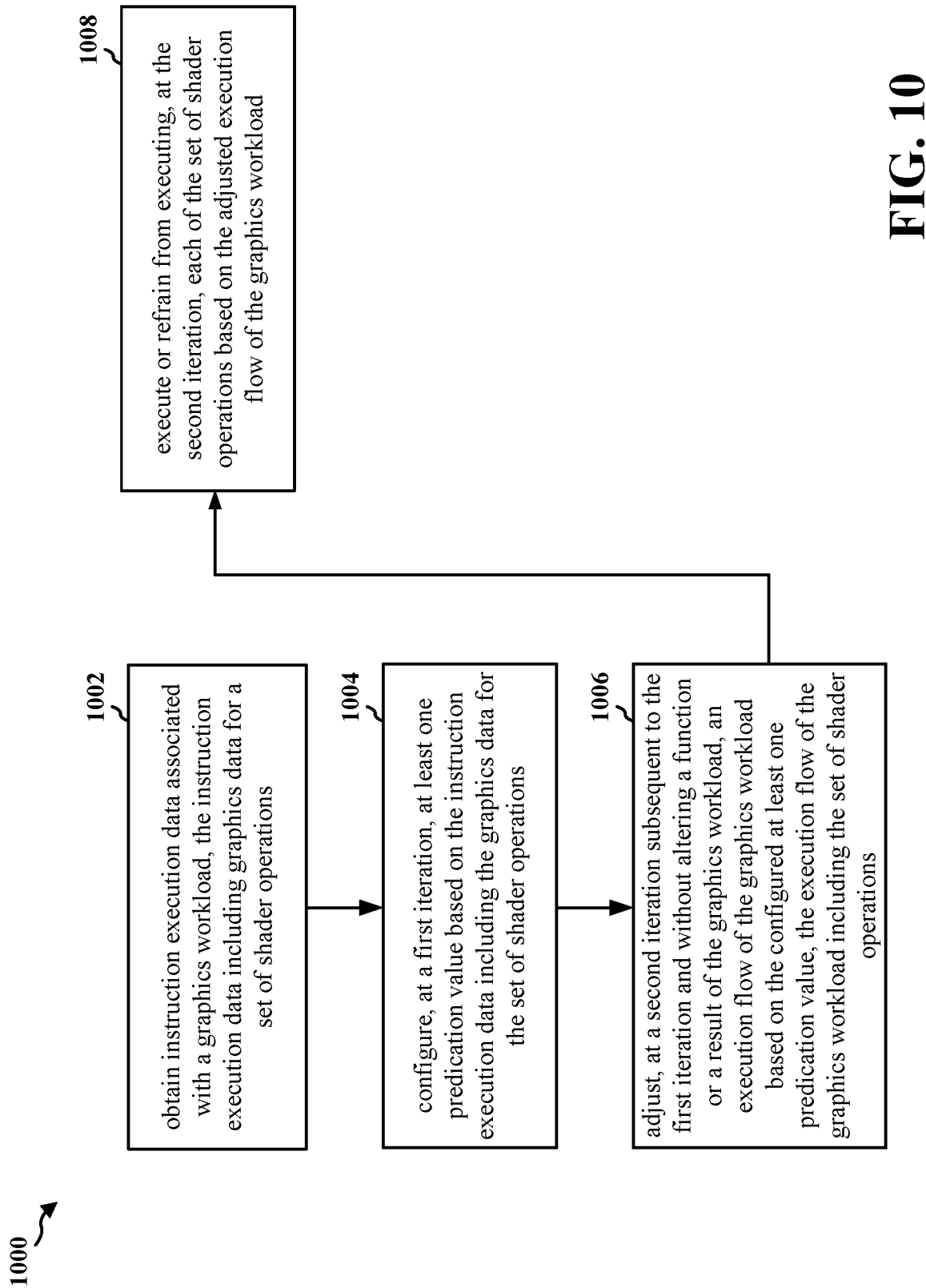
FIG. 10 is a flowchart of an example method of graphics processing in accordance with one or more techniques of this disclosure.

FIG. 10 is a flowchart 1000 of an example method of graphics processing in accordance with one or more techniques of this disclosure. The method may be performed by an apparatus, such as an apparatus for graphics processing, a GPU, a CPU, a wireless communication device, and the like, as used in connection with the aspects of FIGS. 1-9.

At 1002, the apparatus may obtain instruction execution data associated with a graphics workload. The instruction execution data may include graphics data for a set of shader operations. For example, referring to FIG. 9, at 910, the GPU component 902 may obtain instruction execution data 912 associated with a graphics workload from a GPU component 904. Further, 1002 may be performed by the processing unit 120.

At 1004, the apparatus may configure, at a first iteration, at least one predication value based on the instruction execution data including the graphics data for the set of shader operations. The at least one predication value may indicate a likelihood of an occurrence of a condition for the graphics workload. The condition for the graphics workload may be associated with a streaming processor of a GPU. For example, referring to FIG. 9, at 920, the GPU component 902 may configure, at a first iteration, at least one predication value based on the instruction execution data including the graphics data for the set of shader operations. Further, 1004 may be performed by the processing unit 120.

At 1006, the apparatus may adjust, at a second iteration subsequent to the first iteration and without altering a function or a result of the graphics workload, an execution flow of the graphics workload based on the configured at least one predication value. The execution flow of the graphics workload may include the set of shader operations. For example, referring to FIG. 9, at 930, the GPU component 902 may adjust, at a second iteration subsequent to the first iteration and without altering a function or a result of the graphics workload, an execution flow of the graphics workload based on the configured at least one predication value. Further, 1006 may be performed by the processing unit 120.

At 1008, the apparatus may execute or refrain from executing, at the second iteration, each of the set of shader operations based on the adjusted execution flow of the graphics workload. For example, referring to FIG. 9, at 940, the GPU component 902 may execute or refrain from executing, at the second iteration, each of the set of shader operations based on the adjusted execution flow of the graphics workload. Further, 1008 may be performed by the processing unit 120.

Figure 11:
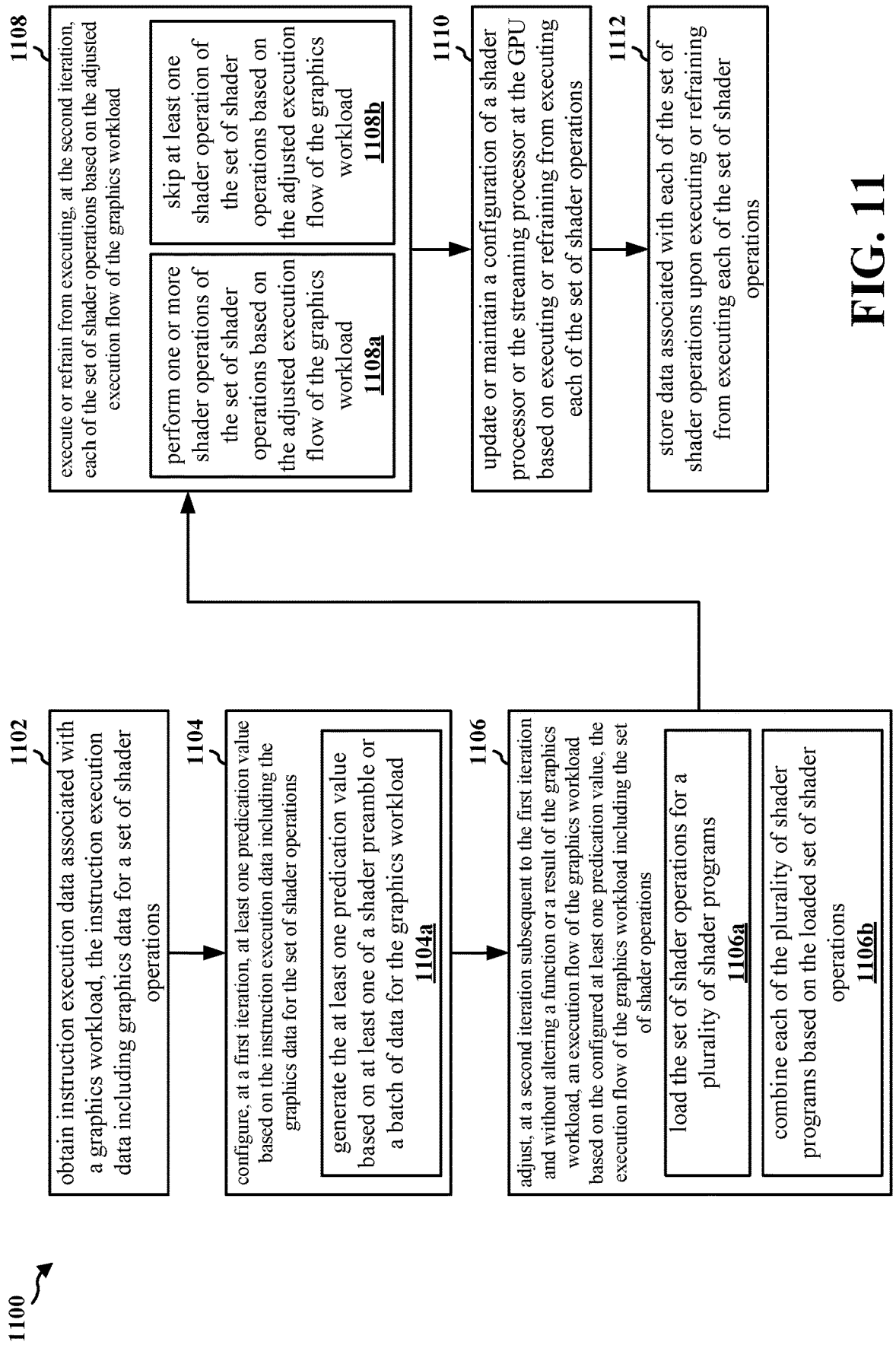
FIG. 11 is a flowchart of an example method of graphics processing in accordance with one or more techniques of this disclosure.

FIG. 11 is a flowchart 1100 of an example method of graphics processing in accordance with one or more techniques of this disclosure. The method may be performed by an apparatus, such as an apparatus for graphics processing, a GPU, a CPU, a wireless communication device, and the like, as used in connection with the aspects of FIGS. 1-9.

At 1102, the apparatus may obtain instruction execution data associated with a graphics workload. The instruction execution data may include graphics data for a set of shader operations. For example, referring to FIG. 9, at 910, the GPU component 902 may obtain instruction execution data 912 associated with a graphics workload from a GPU component 904. Further, 1102 may be performed by the processing unit 120.

At 1104, the apparatus may configure, at a first iteration, at least one predication value based on the instruction execution data including the graphics data for the set of shader operations. The at least one predication value may indicate a likelihood of an occurrence of a condition for the graphics workload. The condition for the graphics workload may be associated with a streaming processor of a GPU. For example, referring to FIG. 9, at 920, the GPU component 902 may configure, at a first iteration, at least one predication value based on the instruction execution data including the graphics data for the set of shader operations. Further, 1104 may be performed by the processing unit 120.

At 1106, the apparatus may adjust, at a second iteration subsequent to the first iteration and without altering a function or a result of the graphics workload, an execution flow of the graphics workload based on the configured at least one predication value. The execution flow of the graphics workload may include the set of shader operations. For example, referring to FIG. 9, at 930, the GPU component 902 may adjust, at a second iteration subsequent to the first iteration and without altering a function or a result of the graphics workload, an execution flow of the graphics workload based on the configured at least one predication value. Further, 1106 may be performed by the processing unit 120.

At 1108, the apparatus may execute or refrain from executing, at the second iteration, each of the set of shader operations based on the adjusted execution flow of the graphics workload. For example, referring to FIG. 9, at 940, the GPU component 902 may execute or refrain from executing, at the second iteration, each of the set of shader operations based on the adjusted execution flow of the graphics workload. Further, 1108 may be performed by the processing unit 120.

In one configuration, the graphics data for the set of shader operations may include at least one of: lighting data, illumination data, depth data, shadow data, or radius data.

In one configuration, the instruction execution data may be obtained based on an FMUL unit of the GPU. The at least one predication value configured at the first iteration may indicate the likelihood of the occurrence of the condition for the graphics workload for the second iteration.

In one configuration, the set of shader operations may include a set of multiplication operations for the graphics workload.

In one configuration, the at least one predication value may be a 1-bit value.

In one configuration, to configure the at least one predication value, at 1104*a*, the apparatus may generate the at least one predication value based on at least one of a shader preamble, a feedback shader, or a batch of data for the graphics workload. For example, referring to FIG. 9, at 920*a*, the GPU component 902 may generate the at least one predication value based on at least one of a shader preamble, a feedback shader, or a batch of data for the graphics workload. Further, 1104*a* may be performed by the processing unit 120.

In one configuration, to adjust the execution flow of the graphics workload, at 1106*a*, the apparatus may load the set of shader operations for a plurality of shader programs. For example, referring to FIG. 9, at 930*a*, the GPU component 902 may load the set of shader operations for a plurality of shader programs. Further, 1106*a* may be performed by the processing unit 120.

At 1106*b*, the apparatus may combine each of the plurality of shader programs based on the loaded set of shader operations. For example, referring to FIG. 9, at 930*b*, the GPU component 902 may combine each of the plurality of shader programs based on the loaded set of shader operations. Further, 1104*b* may be performed by the processing unit 120.

In one configuration, the execution flow of the graphics workload may correspond to a shader sequence for the plurality of shader programs.

In one configuration, to execute each of the set of shader operations, at 1108*a*, the apparatus may perform one or more shader operations of the set of shader operations based on the adjusted execution flow of the graphics workload. For example, referring to FIG. 9, at 940*a*, the GPU component 902 may perform one or more shader operations of the set of shader operations based on the adjusted execution flow of the graphics workload. Further, 1108*a* may be performed by the processing unit 120.

In one configuration, to refrain from executing each of the set of shader operations, at 1108*b*, the apparatus may skip at least one shader operation of the set of shader operations based on the adjusted execution flow of the graphics workload. For example, referring to FIG. 9, at 940*b*, the GPU component 902 may skip at least one shader operation of the set of shader operations based on the adjusted execution flow of the graphics workload. Further, 1108*b* may be performed by the processing unit 120.

In one configuration, at 1110, the apparatus may update or maintain a configuration of a shader processor or the streaming processor at the GPU based on executing or refraining from executing each of the set of shader operations. For example, referring to FIG. 9, at 950, the GPU component 902 may update or maintain a configuration of a shader processor or the streaming processor at the GPU based on executing or refraining from executing each of the set of shader operations. Further, 1110 may be performed by the processing unit 120.

In one configuration, at 1112, the apparatus may store data associated with each of the set of shader operations upon executing or refraining from executing each of the set of shader operations. For example, referring to FIG. 9, at 960, the GPU component 902 may store data 962 associated with each of the set of shader operations to a memory 906 upon executing or refraining from executing each of the set of shader operations. Further, 1112 may be performed by the processing unit 120.

In one configuration, the data may be stored in at least one of: a system memory, a DDR RAM, a constant memory, or an on-chip memory.

In configurations, a method or an apparatus for graphics processing is provided. The apparatus may be a GPU, a CPU, or some other processor that may perform graphics processing. In aspects, the apparatus may be the processing unit 120 within the device 104, or may be some other hardware within the device 104 or another device. The apparatus may include means for obtaining instruction execution data associated with a graphics workload, the instruction execution data including graphics data for a set of shader operations. The apparatus may further include means for configuring, at a first iteration, at least one predication value based on the instruction execution data including the graphics data for the set of shader operations. The at least one predication value may indicate a likelihood of an occurrence of a condition for the graphics workload. The condition for the graphics workload may be associated with a streaming processor of a GPU. The apparatus may further include means for adjusting, at a second iteration subsequent to the first iteration and without altering a function or a result of the graphics workload, an execution flow of the graphics workload based on the configured at least one predication value. The execution flow of the graphics workload may include the set of shader operations. The apparatus may further include means for executing or refraining from executing, at the second iteration, each of the set of shader operations based on the adjusted execution flow of the graphics workload.

In one configuration, the graphics data for the set of shader operations may include at least one of: lighting data, illumination data, depth data, shadow data, or radius data. In one configuration, the instruction execution data may be obtained based on an FMUL unit of the GPU. The at least one predication value configured at the first iteration may indicate the likelihood of the occurrence of the condition for the graphics workload for the second iteration. In one configuration, the set of shader operations may include a set of multiplication operations for the graphics workload. In one configuration, the at least one predication value may be a 1-bit value. In one configuration, the means for configuring the at least one predication value may be further configured to generate the at least one predication value based on at least one of a shader preamble, a feedback shader, or a batch of data for the graphics workload. In one configuration, the means for adjusting the execution flow of the graphics workload may be further configured to load the set of shader operations for a plurality of shader programs; and combine each of the plurality of shader programs based on the loaded set of shader operations. In one configuration, the execution flow of the graphics workload may correspond to a shader sequence for the plurality of shader programs. In one configuration, the means for executing each of the set of shader operations may be further configured to perform one or more shader operations of the set of shader operations based on the adjusted execution flow of the graphics workload. In one configuration, the means for refraining from executing each of the set of shader operations may be further configured to skip at least one shader operation of the set of shader operations based on the adjusted execution flow of the graphics workload. In one configuration, the apparatus may further include means for updating or maintaining a configuration of a shader processor or the streaming processor at the GPU based on executing or refraining from executing each of the set of shader operations. In one configuration, the apparatus may further include means for storing data associated with each of the set of shader operations upon executing or refraining from executing each of the set of shader operations. In one configuration, the data may be stored in at least one of: a system memory, a DDR RAM, a constant memory, or an on-chip memory.

It is understood that the specific order or hierarchy of blocks/steps in the processes, flowcharts, and/or call flow diagrams disclosed herein is an illustration of example approaches. Based upon design preferences, it is understood that the specific order or hierarchy of the blocks/steps in the processes, flowcharts, and/or call flow diagrams may be rearranged. Further, some blocks/steps may be combined and/or omitted. Other blocks/steps may also be added. The accompanying method claims present elements of the various blocks/steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to: (1) tangible computer-readable storage media, which is non-transitory; or (2) a communication medium such as a signal or carrier wave. Data storage media may be any available media that can be accessed by one or more computers or one or more processors to retrieve instructions, code, and/or data structures for implementation of the techniques described in this disclosure. By way of example, and not limitation, such computer-readable media may comprise RAM, ROM, EEPROM, compact disc-read only memory (CD-ROM), or other optical disk storage, magnetic disk storage, or other magnetic storage devices. Disk and disc, as used herein, includes compact disc (CD), laser disc, optical disc, digital versatile disc (DVD), floppy disk, and Blu-ray disc, where disks usually reproduce data magnetically, while discs usually reproduce data optically with lasers. Combinations of the above should also be included within the scope of computer-readable media. A computer program product may include a computer-readable medium.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is a method of graphics processing, including: obtaining instruction execution data associated with a graphics workload, the instruction execution data including graphics data for a set of shader operations; configuring, at a first iteration, at least one predication value based on the instruction execution data including the graphics data for the set of shader operations, the at least one predication value indicating a likelihood of an occurrence of a condition for the graphics workload, the condition for the graphics workload being associated with a streaming processor of a GPU; adjusting, at a second iteration subsequent to the first iteration and without altering a function or a result of the graphics workload, an execution flow of the graphics workload based on the configured at least one predication value, the execution flow of the graphics workload including the set of shader operations; and executing or refraining from executing, at the second iteration, each of the set of shader operations based on the adjusted execution flow of the graphics workload.

Aspect 2 may be combined with aspect 1 and includes that the graphics data for the set of shader operations includes at least one of: lighting data, illumination data, depth data, shadow data, or radius data.

Aspect 3 may be combined with any of aspects 1-2 and includes that the instruction execution data is obtained based on an FMUL unit of the GPU, and the at least one predication value configured at the first iteration indicates the likelihood of the occurrence of the condition for the graphics workload for the second iteration.

Aspect 4 may be combined with any of aspects 1-3 and includes that the set of shader operations includes a set of multiplication operations for the graphics workload.

Aspect 5 may be combined with aspects 1-4 and includes that the at least one predication value is a 1-bit value.

Aspect 6 may be combined with any of aspects 1-5 and includes that configuring the at least one predication value further includes generating the at least one predication value based on at least one of a shader preamble, a feedback shader, or a batch of data for the graphics workload.

Aspect 7 may be combined with any of aspects 1-6 and includes that adjusting the execution flow of the graphics workload further includes: loading the set of shader operations for a plurality of shader programs; and combining each of the plurality of shader programs based on the loaded set of shader operations.

Aspect 8 may be combined with aspect 7 and includes that the execution flow of the graphics workload corresponds to a shader sequence for the plurality of shader programs.

Aspect 9 may be combined with any of aspects 1-8 and includes that executing each of the set of shader operations further includes performing one or more shader operations of the set of shader operations based on the adjusted execution flow of the graphics workload.

Aspect 10 may be combined with any of aspects 1-9 and includes that refraining from executing each of the set of shader operations further includes skipping at least one shader operation of the set of shader operations based on the adjusted execution flow of the graphics workload.

Aspect 11 may be combined with any of aspects 1-10 and further includes updating or maintaining a configuration of a shader processor or the streaming processor at the GPU based on executing or refraining from executing each of the set of shader operations.

Aspect 12 may be combined with any of aspects 1-11 and further includes storing data associated with each of the set of shader operations upon executing or refraining from executing each of the set of shader operations.

Aspect 13 may be combined with aspect 12 and includes that the data is stored in at least one of: a system memory, a DDR RAM, a constant memory, or an on-chip memory.

Aspect 14 is an apparatus for graphics processing including at least one processor coupled to a memory and configured to implement a method as in any of aspects 1-13.

Aspect 15 may be combined with aspects 14 and includes that the apparatus is a wireless communication device.

Aspect 16 is an apparatus for graphics processing including means for implementing a method as in any of aspects 1-13.

Aspect 17 is a computer-readable medium (e.g., a non-transitory computer-readable medium) storing computer executable code, the code when executed by at least one processor causes the at least one processor to implement a method as in any of aspects 1-13.

Various aspects have been described herein. These and other aspects are within the scope of the following claims.

What is claimed is:

1. An apparatus for graphics processing, comprising:
   a memory; and
   at least one processor coupled to the memory and configured to:
   obtain instruction execution data associated with a graphics workload, the instruction execution data including graphics data for a set of shader operations;
   configure, at a first iteration, at least one predication value based on the instruction execution data including the graphics data for the set of shader operations, the at least one predication value indicating a likelihood of an occurrence of a condition for the graphics workload, the condition for the graphics workload being associated with a streaming processor of a graphics processing unit (GPU), wherein the streaming processor comprises a feedback controller block configured to enable the at least one predication value to be configured, and wherein the feedback controller block comprises a set of context registers per shader slot associated with the set of shader operations and a set of counters;
   adjust, at a second iteration subsequent to the first iteration and without altering a function or a result of the graphics workload, an execution flow of the graphics workload based on the configured at least one predication value, the execution flow of the graphics workload including the set of shader operations; and
   execute or refrain from executing, at the second iteration, each of the set of shader operations based on the adjusted execution flow of the graphics workload.

2. The apparatus of claim 1, wherein the graphics data for the set of shader operations includes at least one of: lighting data, illumination data, depth data, shadow data, or radius data.

3. The apparatus of claim 1, wherein the instruction execution data is obtained based on a floating multiply (FMUL) unit of the GPU, and the at least one predication value configured at the first iteration indicates the likelihood of the occurrence of the condition for the graphics workload for the second iteration.

4. The apparatus of claim 1, wherein the set of shader operations includes a set of multiplication operations for the graphics workload.

5. The apparatus of claim 1, wherein the at least one predication value is a 1-bit value.

6. The apparatus of claim 1, wherein to configure the at least one predication value, the at least one processor is further configured to:
   generate the at least one predication value based on at least one of a shader preamble, a feedback shader, or a batch of data for the graphics workload.

7. The apparatus of claim 1, wherein to adjust the execution flow of the graphics workload, the at least one processor is further configured to:
   load the set of shader operations for a plurality of shader programs; and
   combine each of the plurality of shader programs based on the loaded set of shader operations.

8. The apparatus of claim 7, wherein the execution flow of the graphics workload corresponds to a shader sequence for the plurality of shader programs.

9. The apparatus of claim 1, wherein to execute each of the set of shader operations, the at least one processor is further configured to:
   perform one or more shader operations of the set of shader operations based on the adjusted execution flow of the graphics workload.

10. The apparatus of claim 1, wherein to refrain from executing each of the set of shader operations, the at least one processor is further configured to:
    skip at least one shader operation of the set of shader operations based on the adjusted execution flow of the graphics workload.

11. The apparatus of claim 1, the at least one processor being further configured to:
    update or maintain a configuration of a shader processor or the streaming processor at the GPU based on executing or refraining from executing each of the set of shader operations.

12. The apparatus of claim 1, the at least one processor being further configured to:
    store data associated with each of the set of shader operations upon executing or refraining from executing each of the set of shader operations.

13. The apparatus of claim 12, wherein the data is stored in at least one of: a system memory, a double data rate (DDR) random access memory (RAM), a constant memory, or an on-chip memory.

14. The apparatus of claim 1, wherein the apparatus is a wireless communication device.

15. A method of graphics processing, comprising:
    obtaining instruction execution data associated with a graphics workload, the instruction execution data including graphics data for a set of shader operations;
    configuring, at a first iteration, at least one predication value based on the instruction execution data including the graphics data for the set of shader operations the at least one predication value indicating a likelihood of an occurrence of a condition for the graphics workload, the condition for the graphics workload being associated with a streaming processor of a graphics processing unit (GPU), wherein the streaming processor comprises a feedback controller block configured to enable the at least one predication value to be configured, and wherein the feedback controller block comprises a set of context registers per shader slot associated with the set of shader operations and a set of counters;
    adjusting, at a second iteration subsequent to the first iteration and without altering a function or a result of the graphics workload, an execution flow of the graphics workload based on the configured at least one predication value, the execution flow of the graphics workload including the set of shader operations; and
    executing or refraining from executing, at the second iteration, each of the set of shader operations based on the adjusted execution flow of the graphics workload.

16. The method of claim 15, wherein the graphics data for the set of shader operations includes at least one of: lighting data, illumination data, depth data, shadow data, or radius data.

17. The method of claim 15, wherein the instruction execution data is obtained based on a floating multiply (FMUL) unit of the GPU, and the at least one predication value configured at the first iteration indicates the likelihood of the occurrence of the condition for the graphics workload for the second iteration.

18. The method of claim 15, wherein the set of shader operations includes a set of multiplication operations for the graphics workload.

19. The method of claim 15, wherein the at least one predication value is a 1-bit value.

20. The method of claim 15, wherein configuring the at least one predication value further comprises generating the at least one predication value based on at least one of a shader preamble, a feedback shader, or a batch of data for the graphics workload.

21. The method of claim 15, wherein adjusting the execution flow of the graphics workload further comprises:
loading the set of shader operations for a plurality of shader programs; and
combining each of the plurality of shader programs based on the loaded set of shader operations.

22. The method of claim 21, wherein the execution flow of the graphics workload corresponds to a shader sequence for the plurality of shader programs.

23. The method of claim 15, wherein executing each of the set of shader operations further comprises performing one or more shader operations of the set of shader operations based on the adjusted execution flow of the graphics workload.

24. The method of claim 15, wherein refraining from executing each of the set of shader operations further comprises skipping at least one shader operation of the set of shader operations based on the adjusted execution flow of the graphics workload.

25. The method of claim 15, further comprising:
updating or maintaining a configuration of a shader processor or the streaming processor at the GPU based on executing or refraining from executing each of the set of shader operations.

26. The method of claim 15, further comprising:
storing data associated with each of the set of shader operations upon executing or refraining from executing each of the set of shader operations.

27. The method of claim 26, wherein the data is stored in at least one of: a system memory, a double data rate (DDR) random access memory (RAM), a constant memory, or an on-chip memory.

28. A non-transitory computer-readable medium storing computer executable code, the code when executed by at least one processor, causes the at least one processor to:
obtain instruction execution data associated with a graphics workload, the instruction execution data including graphics data for a set of shader operations;
configure, at a first iteration, at least one predication value based on the instruction execution data including the graphics data for the set of shader operations the at least one predication value indicating a likelihood of an occurrence of a condition for the graphics workload, the condition for the graphics workload being associated with a streaming processor of a graphics processing unit (GPU), wherein the streaming processor comprises a feedback controller block configured to enable the at least one predication value to be configured, and wherein the feedback controller block comprises a set of context registers per shader slot associated with the set of shader operations and a set of counters;
adjust, at a second iteration subsequent to the first iteration and without altering a function or a result of the graphics workload, an execution flow of the graphics workload based on the configured at least one predication value, the execution flow of the graphics workload including the set of shader operations; and
execute or refrain from executing, at the second iteration, each of the set of shader operations based on the adjusted execution flow of the graphics workload.

* * * * *